DRIFT CORRECTION

Filed Jan. 14, 1965

INVENTORS
Charles Engelberg
Stefan Orsen
BY Eli Weiss
ATTORNEY

United States Patent Office 3,445,839
Patented May 20, 1969

3,445,839

DRIFT CORRECTION

Charles Engelberg, Bound Brook, and Stefan Orsen, Jersey City, N.J., assignors to American Standard Inc., a corporation of Delaware

Filed Jan. 14, 1965, Ser. No. 425,445
Int. Cl. H04l *3/00;* H03k *13/02*
U.S. Cl. 340—347 9 Claims

ABSTRACT OF THE DISCLOSURE

A system for converting an analog voltage into a digital representation thereof which is free of error due to drift in the system. During a first time interval the analog voltage is applied through an input amplifier to an analog to digital converter, which generates a group of pulses, the number of which corresponds to the magnitude of the analog voltage. These pulses are counted in a bidirectional counter. During a second time interval, a reference voltage is applied through the input amplifier to the analog to digital converter, which generates a second group of pulses, corresponding in number to the magnitude of the drift in the input amplifier. The latter group of pulses is applied to the bidirectional counter to adjust the count stored therein, and thereby provide a drift free digital representation of the analog voltage.

Figure 1:
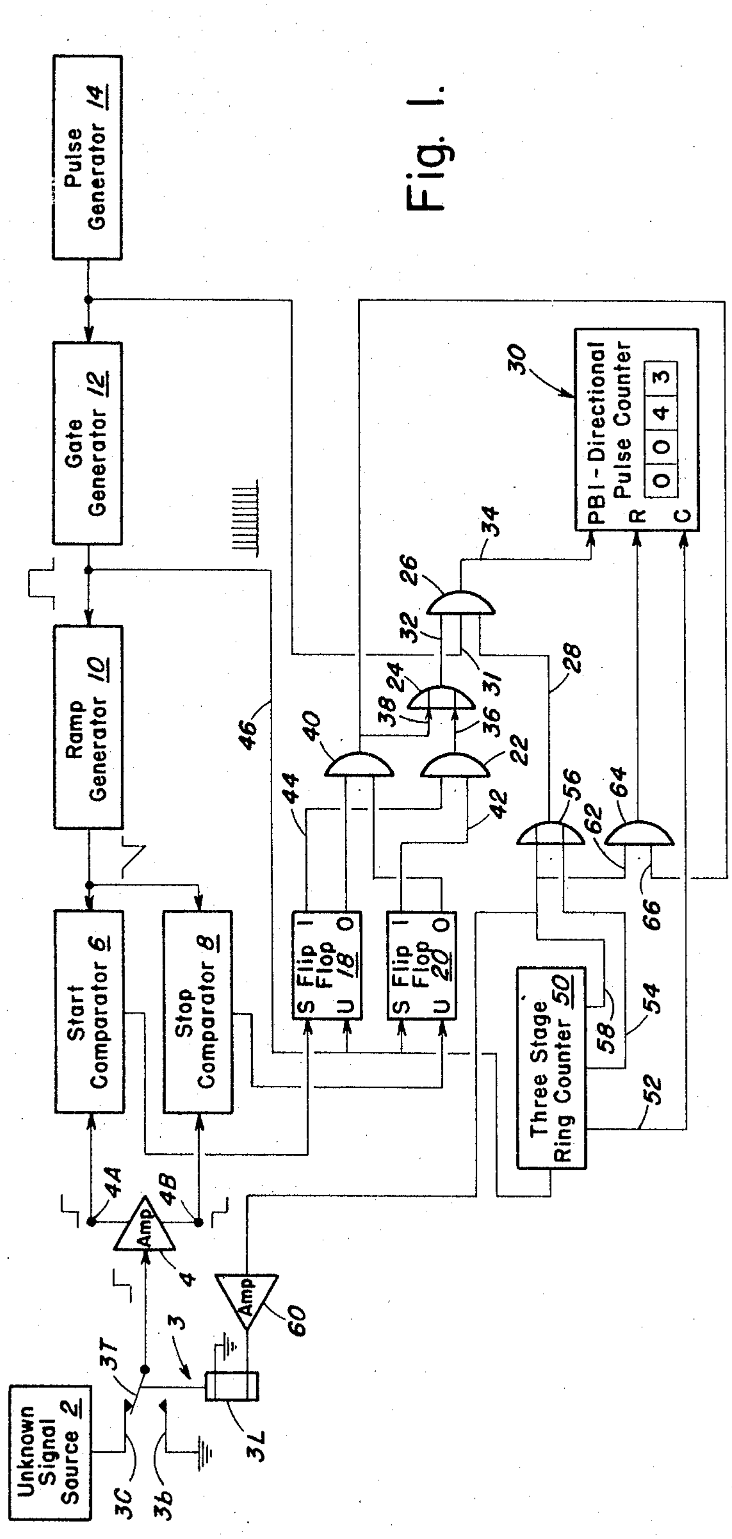

This invention pertains to the conversion of analog signals to digital representation and more particularly to the correction of long term drift in analog to digital systems.

Any analog-to-digital system such as an analog-to-digital converter or a DC digital voltmeter includes at least one analog circuit, i.e., a circuit responsive to signal amplitudes. These circuits may be DC amplifiers, amplitude comparator circuits, linear waveform generators such as ramp generators, etc. Furthermore, these circuits are energized by power supply voltages and are to a degree sensitive to the operating potentials provided by these power supply voltages. All of these circuits, if uncompensated, tend to drift in response to temperature as well as time. Component aging and ambient temperature sensitivity produce errors in the final digital readout. In particular, small percentage changes in the parameters of the analog circuits may introduce considerable errors in the digital result.

Heretofore, in order to eliminate long time drift errors each of the analog circuits was provided with added compensation circuitry in the form of feedback or servo systems, temperature compensating networks, direct-current to alternating-current converters in the form of "chopper" amplifiers and the like. If compensating circuitry were not employed then the circuits themselves were overdesigned to further delay the aging process and to maximize the range of ambient temperature to which the analog circuits were insensitive.

However, it should be apparent that both the addition of compensating circuitry to the required analog circuits and the overdesign of the analog circuits per se is expensive, adds to the complexity of the system, and increases the number of components that can fail.

It is, accordingly, an object of the invention to provide an improved analog-digital system that is unaffected by component drift.

It is another object of the invention to provide an improved drift corrected analog-digital system requiring only a minimum of components to correct for drift in the analog circuits.

It is a further object of the invention to provide a drift corrected analog-digital system whose drift correcting means is, on the one hand, extremely simple and therefore inexpensive, while on the other hand, highly reliable.

It is yet another object of the invention to provide a method for correcting for the drift in the analog circuits of an analog-digital system which converts the amplitude of an analog signal to a digital representation by applying a digital correction to the digital representation.

Briefly, the invention contemplates the correcting of errors in the digital representation of the amplitude of a signal by apparatus which receives and converts the received signal to a plurality of pulses that are accumulated. The apparatus has an input which receives the signal. The signal input is alternately applied to a reference potential so that the apparatus can generate a correction factor in the form of a pulse count to change the number of accumulated pulses. The final count of the accumulated pulses is a corrected digital representation of the amplitude of the received signal.

Other objects, and the features and advantages of the invention will be apparent from the following detailed description when read with the accompanying drawings which show, by way of example and not limitation, the now preferred embodiment of a drift corrected analog-digital system for practicing the invention.

Figure 2:
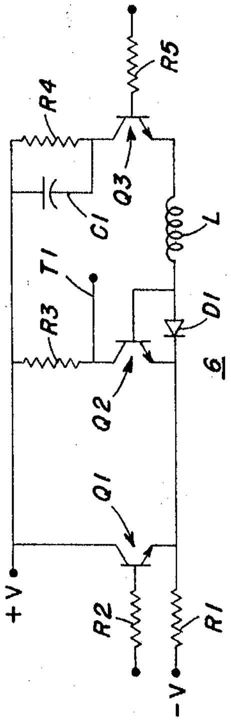

In the drawings:

FIGURE 1 shows a block diagram of the drift corrected analog-digital system; and FIGURE 2 is a schematic diagram of the comparators shown as blocks in FIGURE 1.

In an analog-to-digital converter such as a digital voltmeter, if $E_f$ is a full scale input voltage for a certain range and the corresponding full scale output pulse count is $P_f$, then:

$$E_f = kP_f$$

where $k$ is a linear constant of proportionality. Then, for a fraction $n$ ($n$ being less then one) of the full scale input voltage;

$$nE_f = n(kP_f)$$

Now, if there is any drift in the analog circuits of the system, the drift will affect the output pulse count. Accordingly, $$nE_f = n(kP_f) \pm P_{er}$$

where $P_{er}$=the pulse count due to the drift which may be either positive or negative.

Thus, when the system with drift measures a signal having an amplitude $nE_f$ with respect to a reference voltage an initial pulse count of $n\,(kP_f) \pm P_{er}$ will be accumulated. If the input of the system with drift is then connected to the reference voltage it should yield a second pulse count $P_{er}$. Therefore, when the second pulse count is added or substracted, depending on the direction of the drift from the accumulated first pulse count, a final pulse count of $n(kP_f) \pm P_{er} \mp = n(kP_f)$ is obtained. Therefore, the final pulse count is a drift-error free representation of the amplitude of the input signal with respect to the reference voltage.

More particularly, referring to FIG. 1, there is shown a signal source 2 which transmits a signal whose amplitude with respect to ground is transmitted to the contact 3C of switching means 3.

Switching means 3 is a relay having a normally open contact 3*b*, a normally closed contact 3C, a transfer contact 3T and a coil 3L. The output of switching means 3, transfer contact 3T, is connected to a DC amplifier 4. DC amplifier 4 is a highly stabilized differential DC amplifier having push-pull outputs. The output terminal 4A may swing, for example, from 7.5 volts positive to 15 volts positive while the output terminal 4B swings from 7.5 volts positive to ground potential.

The start comparator 6 has one input connected to output terminal 4A and a second input connected to ramp generator 10. The comparator 8 has one input connected to output terminal 4B and a second input connected to ramp generator 10. The ramp generator 10 is basically a saw-tooth wave generator which when triggered transmits a saw-tooth voltage waveform starting at, say 15 volts positive and ending at ground potential. Each of the comparators does not transmit a signal as long as the positive voltage of the saw-tooth waveform is greater than the voltage of the signal received from DC amplifier 4. When the voltages are equal the comparators transmit signals. In general, the comparators will transmit signals at different times. For example, assume the input signal to the DC amplifier is such that there is a one volt output from the DC amplifier. Accordingly, terminal 4A will be at 8.5 volts and terminal 4B at 6.5 volts. Therefore, since the ramp voltage starts at 15 volts and swings downward it will reach the 8.5 volt level first causing start comparator 6 to generate a signal, and then sometime thereafter it will reach the 6.5 volt level causing stop comparator 8 to generate a signal. The actual circuitry of the comparators will hereinafter be described.

Ramp generator 10 is triggered by gate pulses received from gate generator 12. Gate generator 12 is a monostable multivibrator which when triggered transmits, say an 18 millisecond gate pulse. The triggering of gate generator 12 is performed by pulse generator 14 which is a highly stable 100 kc. free-running pulse generator. Therefore, every 1800th pulse triggers gate generator 12.

To summarize the above, pulse generator 14 transmits pulses at a 100 kilocycle rate. Every 1800th pulse triggers gate generator 12 which transmits an 18 millisecond pulse causing ramp generator 10 to generate a saw-tooth waveform that is fed to one input of each of the comparators 6 and 8. If there is a signal present at the input of DC amplifier 4, the comparators 6 and 8 transmit signals separated in time. The time difference between the two signals is directly proportional to the amplitude of the input signal. During this time difference interval a number of 100 kc. pulses have occurred. Since the saw-tooth waveform is linear, the number of pulses is proportional to the amplitude of the input signal. Hence, if there be provided a time gate which opens when the first comparator transmits a signal and closes when the second comparator transmits a signal and this gate is interposed between the pulse generator 14 and a pulse counter 30 with a visual display, it is possible to represent the amplitude of the input signal as a digital pulse count.

Accordingly, circuitry will now be described to perform this function. In particular, there are the flip-flops 18, 20, and AND gate 22, an OR gate 24, an AND gate 26, and a bi-directional counter 30. The flip-flop 20 is a bistable device having a set true input S (hereinafter called set input), a set false input U (hereinafter called unset input), a true output 1 and a false output 0. When the set input is pulsed, the true output is true and the false output is false. The outputs will remain so until the unset input is pulsed. At that time, the false output is true and the true output is false. The AND gate 22, and all other AND gates, will have a true output and transmit a signal when, and only when, all of its inputs are true. The OR gate 24, and all other OR gates, will have a true output and transmit a signal when, and only when, at least one of its inputs is true. The bidirectional pulse counter 30 is a forward-backward counter which can be a cascaded chain of binary counters with a binary-to-decimal decoding matrix, or it can be a plurality of decade ring counters, or it can be a plurality of decades comprising both binary counters and ring counters. Counter 30 has a count input P connected to the output of AND gate 26. Each time a pulse is received at input P, the accumulated count changes by one. The clear input C is provided to receive a pulse which will clear the accumulated count to zero. Generally, the counter 30 will positively accumulate pulses received at input P, i.e., count forward. However, a reversing input R is provided which, as long as a signal is received at said input, counter 30 will negatively accumulate pulses, i.e., count backward.

The time gating operation will be described, it being assumed that input 28 of AND gate 26 is true. The function of input 28 is concerned with drift correction and will hereinafter be described. The input 31 of AND gate 26 constantly receives pulses from pulse generator 14 at the 100 kilocycle rate. These pulses will pass through to output 34 and the count input P of counter 30 whenever input 32 is true. Input 32 which is also the output of OR gate 24 will be true whenever either of the inputs 36 and 38 thereof are true. For the time being, assume that input 38 is always false. Input 38 which is also the output of AND gate 40 is concerned with drift correction and will be discussed hereinafter. Input 36 which is also the output of AND gate 22 is true whenever both of its inputs 42 and 44 are true. These inputs are connected to the true outputs of flip-flops 20 and 18 respectively. The set input of flip-flop 20 and the unset input of flip-flop 18 are connected via line 46 to the output of gate generator 12. The set input of flip-flop 18 is connected to the output of start comparator 6 and the unset input of flip-flop 20 is connected to the output of stop comparator 8.

Now, assuming that a signal is being fed to DC amplifier 4, the following occurs. Pulse generator 14 is continuously feeding pulses to input 31 of AND gate 26 which is closed. The first pulse from pulse generator 14 triggers gate generator 12 which generates a gate pulse. The gate pulse sets flip-flop 18 false and flip-flop 20 true. Consequently, the output of AND gate 22 is false and the input 32 of AND gate 26 is false. Accordingly, AND gate 26 is closed. The gate pulse also triggers ramp generator 10 and the saw-tooth waveform is transmitted to the comparators 6 and 8. Since a positive signal is being received by amplifier 4, start comparator 6 will operate first and transmits a signal to the set input of flip-flop 18 which sets true. Now, both inputs to AND gate 22 are true and the input 32 of AND gate 26 goes true. The 100 kilocycle pulses pass from input 31 via output 34 to the count input P of counter 30 where they are positively accumulated.

When stop comparator 8 operates, it transmits a signal to the unset terminal of flip-flop 20 which sets false. At that time, the output of AND gate 22 goes false as does the input 32 of AND gate 26, and no more pulses are fed to counter 30. Therefore, counter 30 will now visually display a pulse count proportional to the amplitude of the signal at the input of DC amplifier 4.

Up until now, it has been assumed that amplifier 4 is drift free and that consequently the voltages present at terminals 4A and 4B were a true linear amplification of the input signal. This is not generally the case. There may be drift in DC amplifier 4. The drift can be positive or negative. The following examples will make this point clear. Assume the amplifier has a gain of 10 and that the input signal has an amplitude of 0.5 volt. If there is no drift then the terminal 4A will be at 12.5 volts, i.e., 7.5+5 and terminal 4B will be at 2.5 volts i.e., 7.5−5. The potential difference across terminals 4A and 4B will be 10 volts. The 10 volt difference represents say a count of 1000 pulses. However, if there is a 1 volt negative drift in DC amplifier 4, the difference will be 9 volts or 900 pulses; and if there is a 1 volt positive drift, the difference will be 11 volts or 1100 pulses. Therefore, for a 1 volt negative drift it will be necessary to add 100 pulses to the count and for a 1 volt positive drift to subtract 100 pulses from the count accumulated in counter 30. When measuring negative signals oppositely polarized corrections must be made. The following table summarizes the types of corrections.

TABLE

| Polarity of input signal | Polarity of drift signal | Correction |
|---|---|---|
| + | + | Subtract. |
| − | + | Add. |
| + | − | Add. |
| − | − | Subtract. |

Furthermore, it should be apparent that the drift, if present, will be present whether there is a signal from source 2 or whether the input to DC amplifier 4 is grounded.

The remainder of the circuitry of FIGURE 1 is concerned with drift corrections and will now be discussed. Three state ring counter 50 is a programming device which cycles the apparatus through the following simple program: (a) clear counter 30; (b) measure the voltage from source 2; and (c) correct for the drift voltage.

Ring counter 50 counts gate pulses received at its input from line 46. When ring counter 50 is in its first state, only output 52 is true and transmits a signal to the clear input C clearing counter 30 to zero. When ring counter 50 is in its second state, only output 54 which is connected to one input of OR gate 56 will be true. Accordingly, input 28 of AND gate 26 which is also the output of OR gate 56 is true. Therefore, AND gate 26 will pass 100 kilocycle pulses to counter 30 whenever input 32 is true as previously described.

Whenever ring counter 50 is in its third state only output 58 is true. At this time, switching means 3 is energized via amplifier 60 causing ground to be applied to the input of DC amplifier 4 so that amplifier drift can be measured; input 28 of AND gate 26 is true to permit the passage of correction pulses if necessary in accordance with the state of input 32; and input 62 of AND gate 64 is true to control the direction of accumulating the correction pulses. If the drift is positive then the counter 30 must count backwards. The positive drift causes the second input 66 of AND gate 64 to be false as will hereinafter become apparent. When input 62 is false and 66 is true AND gate 64 transmits a false signal to the reverse input R of counter 30. As long as this false signal is present, counter 30 will count backwards the pulses received at count input P.

During the drift correction step of the program when the input of DC amplifier 4 is grounded three cases arise. First, there can be no drift in amplifier 4. Therefore, outputs 4A and 4B are at the same potential and the comparators 6 and 8 simultaneously transmit signals and flip-flop 18 is simultaneously set true and flip-flop 20 set false. The output of AND gate 40 whose inputs are connected to the false and true outputs of both flip-flops has a false output and the output of AND gate 22 whose inputs are connected to the true outputs of flip-flops 18 and 20 has a false output. Consequently, input 32 of AND gate 26 is false and no correction pulses pass to counter 30.

If there is a negative drift, then the potential of terminal 4B will be higher than the potential of terminal 4A. If the drift is one volt then terminal 4B will be at an 8 volt positive potential and terminal 4A will be at a 7 volt positive potential. Now, as the ramp voltage is fed to the comparators (remembering it sweeps from 15 volts positive to ground) stop comparator 8 will be the first to transmit a signal. Remembering that the gate pulse which initiated the saw-tooth voltage had set flip-flop 18 false and flip-flop 20 true, the signal from comparator 8 sets flip-flop 20 false and both flip-flops are set false. Their false outputs connected to inputs of AND gate 40 are false causing the output thereof to be true to inversion. Accordingly, input 66 is true and, since the system is in the drift correction step, input 62 is true, AND gate 64 transmits a signal to input R priming counter 30 to count forwards. In addition, the true output of AND gate 40 causes input 32 to be true and 100 kilocycle pulses pass through AND gate 26 to the count input P of counter 30.

When the saw-tooth voltage reaches 7 volts, start comparator 6 transmits a signal which sets flip-flop 18 true. The false output thereof goes false causing the output of AND gate 40 to go false as well as input 32 and no further pulses are fed to counter 30. Counter 30 now visually displays a count number representing the true amplitude of the unknown signal from source 2, i.e., the sum in the count of the number of pulses received while the unknown signal was measured and the count of the number of pulses received when the negative drift was measured.

If the drift had been positive, then the voltage at output 4A would be higher than the voltage at terminal 4B. Accordingly, as previously described, start comparator 6 would first transmit a signal and the output of AND gate 22 would be true. Pulses would pass through AND gate 26 and counter 30 would backward count since the input 66 of AND gate 64 is false. The count would continue until stop comparator 8 transmitted a signal setting flip-flop 20 false. Counter 30 now visually displays the difference of the count of the pulses it received when the unknown signal was measured and the count of the pulses it received when the positive drift signal was measured.

Each of the comparators 6 and 8 are identical, therefore, only start comparator 6 will be described with respect to FIGURE 2. Start comparator 6 comprises: the n-p-n transistor Q1 having an emitter connected via resistor R1 to source of negative voltage −V, a base connected via resistor R2 to the output of ramp generator 10, and a collector connected to source of positive potential +V; the n-p-n transistor Q2 having an emitter connected to the emitter of transistor Q1, a collector conected via resistor R3 to source of positive potential +V and a base connected to the anode of tunnel diode D1 whose cathode is conected to the emitter of transistor Q2; the n-p-n transistor Q3 having an emitter connected via an inductor L to the anode of tunnel diode D1, a collector connected via a parallel RC network including R4 and C1 to source of positive potential +V, and a base connected via resistor R5 to the output 4A of DC amplifier 4; and an output terminal T1 for connecting the collector of transistor Q2 to the set input of flip-flop 18.

Assuming the positive potential +V to be +15 volts, the negative potential −V to be −15 volts, the saw-tooth voltage to swing from +15 volts down to ground and the voltage received from output 4A to never exceed +15 volts, the comparator operates as follows. Initially, because a +15 volt signal is present at the base of transistor Q1 and less than a +15 volt signal is present at the base of transistor Q3, tunnel diode D1 is back biased and transistor Q2 is cut off. However, when the voltage at the base of transistor Q1 is just below the voltage at the base of transistor Q3, tunnel diode D1 conducts causing transistor Q2 to conduct. When transistor Q2 conducts, it transmits a signal from its output terminal T1.

Stop comparator 8 is identical except that the equivalent of resistor R5 is connected to output 4B and the equivalent of terminal T1 is connected to the unset input of flip-flop 20.

While only one embodiment of the invention has been shown and described in detail there will now be obvious to those skilled in the art many modifications and variations satisfying many or all of the objects of the invention.

What is claimed is:

1. Drift corrected analog-digital apparatus comprising: pulse generating means including means for converting signals received thereby to a plurality of pulses; the number of pulses in said plurality being related to the amplitude of the received signal; bidirectional pulse counting means including a pulse input for receiving pulses from the output of said pulse generating means, a control input responsive to the receipt of a control signal for causing said bidirectional pulse counting means to change the count in a first direction for each pulse received at said pulse input, and means for displaying the pulse count; switch means including an output connected to the input of said pulse generating means; a first input for said switch means and adapted to receive a signal; a reference voltage source; a second input for said switch means and connected to said reference voltage source; and means for sequentially connecting said switch means output to both said first and second switch means inputs; and polarity sensing means coupled to said pulse generating means for sensing for the polarity of the signal in said pulse generating means which is being converted to a plurality of pulses when the output of said switch means is connected to the second input of switch means for transmitting a control signal to the control input of said pulse counting means when the polarity of said signal in said pulse generating means is negative with respect to said reference potential to cause said pulse counting means to further change the count in said first direction for each pulse received.

2. The apparatus of claim 1 further comprising a DC amplifier including an input and an output, means for connecting the input of said DC amplifier to the output of said switch means, and means for connecting the output of said DC amplifier to the input of said pulse generating means.

3. Drift corrected analog-digital apparatus comprising: pulse generating means including an input and an output for converting signals received at said input to a plurality of pulses to be transmitted from said output; the number of pulses in said plurality being related to the amplitude of the received signal; bidirectional pulse counting means including a pulse input for receiving from the output of said pulse generating means, said pulse counting means normally changing the count in a first direction for each pulse received at said pulse input, a control input responsive to the receipt of a control signal for causing said bidirectional pulse counting means to change in a second direction the count for each pulse received at said pulse input, and means for displaying the pulse count; switch means including an output connected to the input of said pulse generating means, a first input adapted to receive a signal, a reference voltage source, a second input connected to said reference voltage source, and means for sequentially connecting said switch means output to both said first and second switch means inputs; and polarity sensing means coupled to said pulse generating means for sensing for the polarity of the signal in said pulse generating means which is to be converted to a plurality of pulses when the output of said switch means is connected to the second input of said switch means for transmitting a control signal to the control input of said pulse counting means when the polarity of said signal in said pulse generating means is positive with respect to said reference potential.

4. The apparatus of claim 3 further comprising a DC amplifier including an input and an output, means for connecting the input of said DC amplifier to the output of said switch means, and means for connecting the output of said DC amplifier to the input of said pulse generating means.

5. Drift corrected analog-digital apparatus comprising: pulse generating means including an input and an output for converting signals received at said input to a plurality of pulses transmitted from said output; the number of pulses in said plurality being related to the amplitude of the received signal; bidirectional pulse counting means including a pulse input for receiving pulses from the output of said pulse generating means, a control input means responsive to the receipt of a first control signal for causing said bidirectional pulse counting means to increase the count for each pulse received at said pulse input and responsive to the receipt of a second control signal for causing said bidirectional pulse counting means to decrease the count for each pulse received at said pulse input, and means for displaying the pulse count; switch means including an output connected to the input of said pulse generating means, a first input adapted to receive a signal, a reference voltage source, a second input connected to said reference voltage source, and means for sequentially connecting said switch means output to both said first and second switch means inputs; and polarity sensing means coupled to said pulse generating means for sensing for the polarity of the signal in said pulse generating means which is to be converted to a plurality of pulses upon the connection of the output of said switch means to the second input of said switch means for transmitting a first control signal to the control input means of said pulse counting means when the polarity of said signal in said pulse generating means is negative with respect to said reference potential and a second control signal to the control input means of said pulse counting means when the polarity of said signal in said pulse generating means is positive with respect to said reference potential.

6. Apparatus for correcting drift in a hybrid analog-digital system comprising: a DC amplifier including an input terminal and an output terminal; switch means including an output terminal coupled to said input terminal of said DC amplifier, a first input terminal adapted to receive a signal whose amplitude is to be measured, and a second input terminal at a reference potential; an analog-to-digital converter including an input terminal connected to the output terminal of said DC amplifier and an output terminal for converting the signals received at its input terminal to a plurality of pulses to be transmitted from its output terminal, the number of pulses in said train being proportional to the amplitude of the signal received at its input terminal; a reversible pulse counter having an input terminal connected to the output terminal of said analog-to-digital converter; and a control input terminal means for selectively controlling said reversible counter to count in forward and backward directions; and polarity sensing means coupled to said analog-to-digital converter and actuable when the output terminal of said switch means is connected to the second input terminal of said switch means for transmitting a control signal to the control input means of said reversible counter for causing said counter to count in a direction related to the polarity of the signal in said analog-to-digital converter which causes the generation of the train of pulses with respect to said reference voltage.

7. A drift corrected analog-digital system comprising: a source of reference potential subject to drift in magnitude and direction; a source of analog signals; pulse generating means; bidirectional pulse counting means including an input, for counting pulses received at said input; means for connecting said pulse generating means sequentially to said source of analog signals and said source of reference potential, so that pulses generated by said pulse generating means will supply a first group of pulses to said bidirectional counting means corresponding to the amplitude of the analog signals and a second group of pulses corresponding to the amplitude of the reference potential; and means for algebraically combining both groups of pulses so as to exhibit the drift-free magnitude of the analog signals.

8. Drift corrected analog-digital apparatus comprising: pulse generating means; bidirectional pulse counting means connected to the pulse generating means to receive pulses therefrom and including means for exhibiting the number of pulses received thereby; switch means including an output connected to said pulse generating means and having a first input to receive an analog signal and a second input to receive a reference voltage, the magnitude and direction of which corresponds to the drift of the apparatus; means for sequentially operating said switch means so that two separate groups of pulses are supplied by said pulse generating means to said bidirectional pulse counting means, one of the groups of pulses corresponding to the magnitude of the analog signal and the other corresponding to the magnitude of the reference voltage; and said bidirectional pulse counting means including means for additively combining both groups of pulses algebraically so that bidirectional pulse counting means will exhibit a count of pulses corresponding to the analog signal substantially free of drift.

9. Drift corrected analog-digital apparatus comprising: pulse generating means; bidirectional pulse counting means coupled to said pulse generating means for numerically displaying a count of pulses received from said pulse generating means; switch means having a first input to receive an analog signal and a second input to receive a reference voltage; a DC amplifier coupling said switch means and said pulse generating means with said bidirectional pulse counting means; means for sequentially operating said switch means to cause the pulse generating means to produce a first group of pulses corresponding to the amplitude of the analog signal without correction as the drift of said apparatus and a second group of pulses corresponding to the amplitude of said reference voltage to be algebraically added to the first group of pulses; whereby the number of pulses accumulated by said bidirectional pulse counting means and exhibited thereby represents the amplitude of the analog signal with respect to the reference voltage.

References Cited

UNITED STATES PATENTS

| | | | |
|---|---|---|---|
| 2,963,697 | 12/1960 | Giel | 340—347 |
| 3,201,781 | 8/1965 | Holland | 340—347 |

OTHER REFERENCES

Propster, C. H., Jr.: "Analog to Digital Converter," IBM Technical Disclosure Bulletin, vol. 5, No. 8, January 1963.

MAYNARD R. WILBUR, *Primary Examiner.*

G. R. EDWARDS, *Assistant Examiner.*